(12) United States Patent
Thiedig et al.

(10) Patent No.: US 7,185,574 B2
(45) Date of Patent: Mar. 6, 2007

(54) METHOD AND DEVICE FOR SEPARATING DISC-SHAPED BODIES FROM AN ORIGINAL BODY

(76) Inventors: Ullrich Thiedig, Bürgerstrasse 19, Braunschweig (DE) 38118; Holger Wente, Vossenkamp 9, Braunschweig (DE) 38108; Bernd Köster, Tiemorgen 8, Cremlingen (DE) 38162

( * ) Notice: Subject to any disclaimer, the term of this patent is extended or adjusted under 35 U.S.C. 154(b) by 0 days.

(21) Appl. No.: 09/931,606

(22) Filed: Aug. 16, 2001

(65) Prior Publication Data

US 2003/0205120 A1     Nov. 6, 2003

Related U.S. Application Data

(63) Continuation of application No. PCT/DE00/00428, filed on Feb. 15, 2000.

(30) Foreign Application Priority Data

Feb. 16, 1999 (DE) ................................ 199 06 021

(51) Int. Cl.
    *B26D 7/06*     (2006.01)
(52) U.S. Cl. .............................. 83/74; 83/363; 83/365; 83/367; 83/932
(58) Field of Classification Search ................ 83/36, 83/72, 74, 75, 75.5, 76.8, 363, 365, 367, 83/371, 401, 409, 420, 422, 440, 448, 449, 83/450, 452, 932
See application file for complete search history.

(56) References Cited

U.S. PATENT DOCUMENTS

| | | | |
|---|---|---|---|
| 3,105,533 A * | 10/1963 | Hensgen et al. ............... 83/36 |
| 3,894,457 A * | 7/1975 | Miller et al. .................... 83/27 |
| 4,136,504 A * | 1/1979 | Wyslotsky ................... 53/435 |
| 4,557,019 A | 12/1985 | Van Devanter et al. |
| 4,875,254 A * | 10/1989 | Rudy et al. ................. 452/157 |
| 5,054,345 A * | 10/1991 | Weber ............................ 83/42 |
| 5,076,124 A * | 12/1991 | Whitehouse ................. 83/105 |
| 5,129,298 A | 7/1992 | Cresson et al. |
| 5,136,906 A * | 8/1992 | Antonissen et al. ........... 83/42 |
| 5,241,365 A * | 8/1993 | Haagensen .................. 356/604 |

(Continued)

FOREIGN PATENT DOCUMENTS

DE     28 20 583     1/1987

(Continued)

*Primary Examiner*—Kenneth E. Peterson
(74) *Attorney, Agent, or Firm*—Husch & Eppenberger LLC; Robert C. Haldiman

(57) ABSTRACT

A device for separating disc-shaped bodies from an original body includes a separating device, a feeding device, an optical recognition device for determining the front face contour of the original body and lamps for illuminating the surroundings of the cutting surface. The recognition device detects the front face using the contrast between the surroundings of the front face and the original body in relation to the determined front face. The lamps are mounted in a tunnel and arranged in a planar manner along the longitudinal direction of the original body. The method includes the steps of guiding the source body in a tunnel, mounting a plurality of lamps in a planar fashion along the longitudinal direction of the source body in the tunnel, and illuminating the source body and the environment of the face of the source body with the plurality of lamps.

10 Claims, 4 Drawing Sheets

U.S. PATENT DOCUMENTS

| | | | |
|---|---|---|---|
| 5,241,885 A | * | 9/1993 | Kuchler .................. 83/76.7 |
| 5,324,228 A | * | 6/1994 | Vogeley, Jr. ............. 452/158 |
| 5,352,153 A | * | 10/1994 | Burch et al. ............. 452/157 |
| RE36,664 E | * | 4/2000 | O'Brien et al. ........... 452/157 |
| 6,164,174 A | * | 12/2000 | Sigurdsson et al. ......... 83/13 |

FOREIGN PATENT DOCUMENTS

| | | |
|---|---|---|
| DE | 38 08 790 | 9/1989 |
| DE | 37 14 199 | 4/1990 |
| DE | 42 06 196 | 8/1996 |
| DE | 196 04 254 | 8/1997 |
| EP | 0 243 568 | 11/1987 |
| EP | 0 246 668 | 11/1987 |
| FR | 2 627 423 | 8/1989 |

* cited by examiner

METHOD AND DEVICE FOR SEPARATING DISC-SHAPED BODIES FROM AN ORIGINAL BODY

CROSS REFERENCE

This application is a continuation of PCT Application No. PCT/DE00/00428 filed 15 Feb. 2000 and which named the United States as a designated country. PCT Application PCT/DE00/00428 was published on 24 Aug. 2000 as Publication No. WO 00/48800 and claims priority of German Application 199 06 021.5 filed on 16 Feb. 1999.

FIELD OF THE INVENTION

The present invention relates generally to the field of pre-packaged foods and, more particularly, concerns a method and an apparatus for separating disc-shaped bodies from a source body, wherein the environment of the face of the source body is illuminated.

BACKGROUND OF THE INVENTION

The respective face of the source body is optically detected with a detection device by means of the contrast between the environment of the face and the face. The slice thickness required for a predetermined slice weight is determined from the specific gravity of the source body and face. The separation of the disc-shaped body is controlled with the value determined in this way.

Many foods such as cheese, ham, sausage, etc. are provided for sale in the market prepacked in sliced form, a relatively large proportion being supplied as so-called equalized goods with a fixed weight. When cutting up the products, the fixed weight must be maintained as exactly as possible according to the tolerance standards of the prepacking regulations. Fluctuations in product cross-section within a product string, and also from one product string to the next, make it difficult, if not impossible, to meet these tolerance standards. Therefore it is advantageous to utilize methods for detecting the product cross-section at the right time, which allow adaptation of product advance the moment there is also a change in cross-section.

DE-C-28 20 583 C2 and EP 246 668 A2 describe a method in which the weight of the already cut-off slices is determined with scales, and advance is adjusted according to the measured total weight. This method is intricate and tedious because all scales need a certain time to reach their position of equilibrium. Rapid weighing is therefore thwarted by physical laws such as e.g. natural oscillation processes, poor filtering of interference, etc. and the unavoidable time lapse between weighing and cutting operations.

Also known, e.g. from U.S. Pat. No. 4,557,019, are methods which are based on scanning the surfaces of the products before the cutting operation. In this case the outer casing of the source body to be sliced is scanned, e.g. by a triangulation method, before the cutting operation and advance is later adapted during the cutting operation according to the previously calculated volume or the measured cross-sections. Due to the non-uniform shape of the products, however, the exact positioning is lost during transport to the cutting shaft. When the products are picked up by a gripper claw, particularly due to the associated buckling movement. Hence the actual cross-section is changed from the calculated one. Due to the limited number of cameras, shadow areas in which the surface is not correctly detected occur, depending on the actual shape of the products. Also, hollow layers and severe distortions as a rule lead to overestimates of volume. Although the illumination and soiling of the scanning device in this method are relatively unproblematic, the actual cross-sectional area is not determined with sufficient accuracy.

DE-A-38 08 790 A1 describes a method for detecting the cut surfaces during the cutting operation, in which the cut surface is illuminated with lamps and detected with a CCD camera, using the reflection behavior. Both the camera and the lamps are mounted in front of the cut surface. The method is limited in that if the height of fall cannot be made high enough for reasons of cutting technology, such as in the case of portions which, owing to their height increasing with cutting or special shingle techniques, come very close in front of the cutting surface. Also, problems arise with cutting devices which work with very high cutting outputs of up to 2,000 cuts per minute. At these high speeds the slice which has already been cut off is still falling while the picture is already being taken for the following slice which has not yet been cut. The camera and lighting angle must therefore inevitably be very flat, and it is almost impossible to accomplish illumination without throwing disturbing shadows or without uncontrolled back reflection. Furthermore, the camera and the lighting must be mounted in areas with extremely high contamination.

The above-mentioned drawbacks could be reduced with the cutting device described in DE-C-37 14 199 C2, by mounting the lighting elements directly behind the cutting plane adjacent to the cutting blade. Due to direct determination of the cut surface, the actual cross-sectional area can be detected very precisely. With the apparatus described, however, there arises problems with the picture quality due to reflection and shadow formation with different source bodies and due to shadow formation by additional elements of the cutting apparatus, e.g. holding arms.

U.S. Pat. No. 5,129,298 describes a cutting apparatus in which the contour of a source body is illuminated with dark field lighting. For this purpose, three lighting elements are mounted behind the source body for lighting a ground glass screen, in order to direct light rays obliquely from above in the longitudinal direction of the source body onto the upper cut edge and obliquely from the side onto the side edges. Due to reflection and shadow formation, however, the quality of illumination can be impaired. Also, hollow layers and indentations on the underside of the product cannot be detected.

From DE-C-42 06 196 C2 is known the use of an advance tunnel in conjunction with cutting machines. Traditional advance tunnels however are used only for safety reasons and for better guiding of the source body.

SUMMARY OF THE INVENTION

It is therefore an object of the invention to provide a method and an apparatus for separating disc-shaped bodies from a source body, in which one or more of the above-mentioned problems are avoided.

In accordance with the present invention there is provided a method for separating disc-shaped bodies from a source body wherein the environment of the face of the source body is illuminated, the respective face of the source body is optically detected with a detection device by means of the contrast between the environment of the face and the face, the slice thickness required for a predetermined slice weight is determined from the specific gravity of the source body and face, separation of the disc-shaped body is controlled with the value determined in this way, and the source body is guided in a tunnel and illuminated with a plurality of lamps which are mounted in planar fashion along the longitudinal direction of the source body in the tunnel.

With the method of the invention, the environment of the face of the source body should be illuminated, the respective face of the source body should be optically detected with a detection device by means of the contrast between the environment of the face and the face, the slice thickness required for a predetermined slice weight should be determined from the specific gravity of the source body and face, and separation of the disc-shaped body should be controlled with the value determined in this way.

A preferred apparatus comprises a separating device, an advance device for advancing the source body towards the separating device, an optical detection device for determining the face contour of the source body, and lamps for illuminating the environment of the cut surface, wherein the detection device determines the face by means of the contrast between the environment of the face and the source body. Furthermore, the source body is advanced as a function of the measured face.

The object is achieved by the fact that the source body is guided in a tunnel and the source body is illuminated with a plurality of lamps which are mounted in planar fashion along the longitudinal direction of the source body in the tunnel.

In accordance with the present invention there is provided a method for separating disc-shaped bodies from a source body having a face and a longitudinal direction, including the steps of: guiding the source body in a tunnel, mounting a plurality of lamps in a planar fashion along the longitudinal direction of the source body in the tunnel, illuminating the source body and the environment of the face of the source body with said plurality of lamps, optically detecting a respective face of the source body with a detection device by means of the contrast between the environment of the face and the face, determining the slice thickness required for a predetermined slice weight from the specific gravity of the source body and face, and controlling separation of the disc-shaped body from the source body utilizing the value determined in the preceding step.

Correspondingly, the apparatus includes a tunnel in which the source body is guided, the tunnel having an end adjacent a separating device, and means for mounting a plurality of lamps in the tunnel and in a planar fashion along the longitudinal direction of the source body. As a result, uniform, high-contrast illumination of the environment of the face is ensured. It was found that disturbing reflection and shadow formation can be substantially reduced by planar arrangement of lamps in a tunnel.

It was discovered that a tunnel is eminently suitable for improved illumination of the cut edges of the source body if a plurality of lighting elements are mounted in the tunnel.

Due to the fact that the lamps form a tunnel which begins a sufficient distance before the separating device or cutting plane and ends at the separating device, the source body is illuminated uniformly all round. Shadow formation can be reduced and the contrast increased by installing the lamps in a tunnel made of reflective material. The tunnel advantageously has up to four different regions which deliver different types of radiation. In a first region diffuse radiation occurs with an intensity that is reduced towards the cutting plane. The first region consists of the front surface of the tunnel adjacent to the cut surface, the central region of the tunnel cover, the front and central portions of the side walls, and the tunnel bottom.

Advantageously, the lamps may be individually adjusted by individually orienting the direction of radiation of the lamps, which can be accomplished, for example, by utilization of a motorized means. Advantageously the adjustment of the lamps is made with a corresponding control system comprising a memory for storing settings for the lamps. As a result, the settings for different ambient conditions can be adjusted once and called up again at any time without great effort, and the lamps can be adjusted with corresponding adaptation to the precise ambient conditions.

Because the lamps are controlled in pulsed fashion and the detection device is controlled in correspondingly triggered fashion, product-damaging heat generation is avoided and the camera focus and signal-to-noise ratio against ambient light are advantageously increased.

Advantageously, the lamps are readjusted during operation by the control system, which evaluates reflection signals and contrast information of the detection device and adjusts the lamps in such a way that the reflection is minimized and the contrast increased.

In a second region, radiation directed rearwards away from the cutting plane is delivered. This second region is composed of the front portion of the tunnel cover adjacent to the cutting plane, and serves in particular to illuminate additional elements such as product hold-down devices. In a third region, radiation directed obliquely forwards towards the cutting plane is delivered so that the cut edge is illuminated and the contrast increased. The third region is composed of the rear portion of the tunnel cover.

In a fourth region, radiation is directed straight onto the source body. This fourth region is composed at least of the central region of the exposed side wall. This region serves to illuminate the side surface of the source body.

It is particularly advantageous if at least the side wall, with which the source body is in contact, is slidable. Then the face can be oriented and detected optimally. By sliding the side walls, the lighting conditions can also be optimized.

BRIEF DESCRIPTION OF THE DRAWINGS

Reference is now made more particularly to the drawings which illustrate the best presently known mode of carrying out the invention and wherein similar reference characters indicate the same parts throughout the drawing figures. The embodiment of the invention is described in more detail below with the aid of the attached drawings in which.

DETAILED DESCRIPTION

Figure 1:
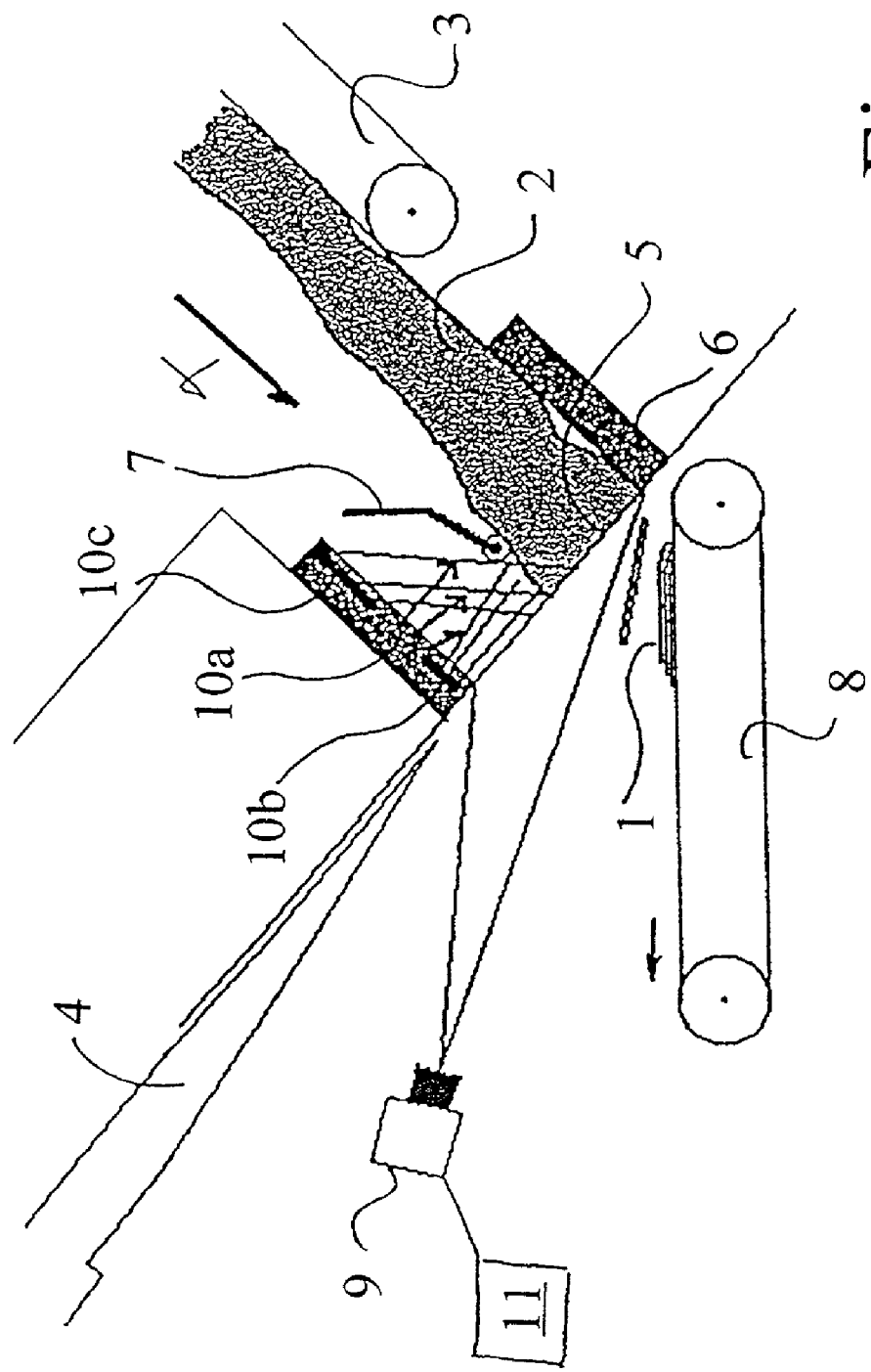
FIG. 1 is a schematic view of an apparatus for separating disc-shaped bodies from a source body.

FIG. 1 shows a schematic view of the apparatus for separating disc-shaped bodies 1 from a source body 2, in which the source body 2 is mounted on an advance device 3 and delivered by the latter to a separating device 4. The separating device 4 is, in the embodiment shown, an eccentrically rotating circular blade. The source body 2 is carried by a lighting frame 6 in the vicinity of the cut surface 5. The upper side of the source body 2 is guided by a hold-down device 7, which is inclined in the direction of transport T. The lighting frame 6 and the advance device 3 are inclined, so that the direction of transport T forms an angle of approximately 45° in relation to the horizontal. The disc-shaped bodies 1 then drop down by force of gravity and are transported away from the separating device 4 by a discharge belt 8. The discharge belt 8 is a horizontal conveyor belt. The cut surface 5 of the source body 2 is detected by a camera 9 which is mounted on the right in front of the cut surface and at a relatively flat angle thereto. The camera angle must be relatively flat, above all in case of very high cutting outputs, so that the uncut slices can already be photographed while the already cut-off slices are falling. Lighting elements 10*a*, 10*b*, 10*c* are mounted in the lighting frame 6 and radiate downwards in the direction of the cut edge of the source body 2.

Figure 2:
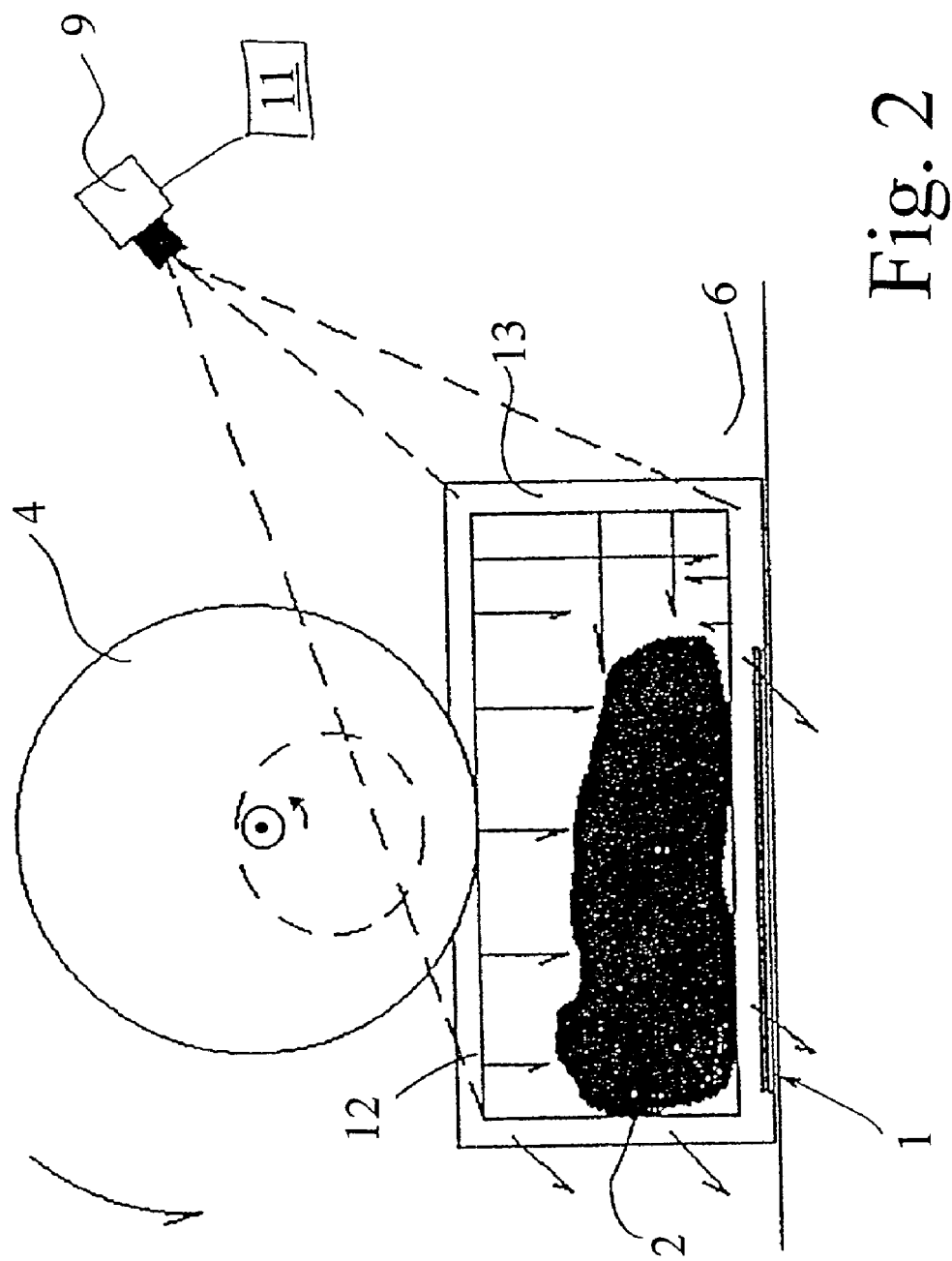
FIG. 2 is a front view of the apparatus.

FIG. 2 shows the front view of the apparatus. The source body 2, e.g. sausage, ham, cheese, etc., is mounted in the lighting frame 6 and illuminated by the lighting elements 10*a*, 10*b*, 10*c* which are installed in the lighting frame 6. The separating device 4 in this particular preferred embodiment is a circular blade which rotates on its own axis, with the shaft being mounted so as to rotate eccentrically. As a result, disc-shaped bodies 1 are separated cyclically one after the other from the source body 2. The camera 9 is mounted at a flat angle on the right, in front of the cut surface 5 and the lighting frame 6, and detects the whole opening of the lighting frame 6. It can be seen that the lighting frame 6 forms a tunnel through which the source body 2 passes during the cutting operation. This tunnel begins, as can be seen in FIG. 1, at sufficient distance before the cutting plane and ends at the cutting plane. The camera 9 detects both the cut surface 5 and the front region of the lighting frame 6 directly. A detection device 11 connected to the camera 9 evaluates the contours between the cut surface 5 and the opening of the lighting frame 6 and determines the respective face of the source body 2. From the previously established specific gravity of the source body 2 and the measured face, the slice thickness required for a predetermined slice weight is calculated. The advance device 3 is controlled by the detection device 11 in such a way that during subsequent cutting, the corresponding slice thickness is separated from the source body 2.

Figure 3:
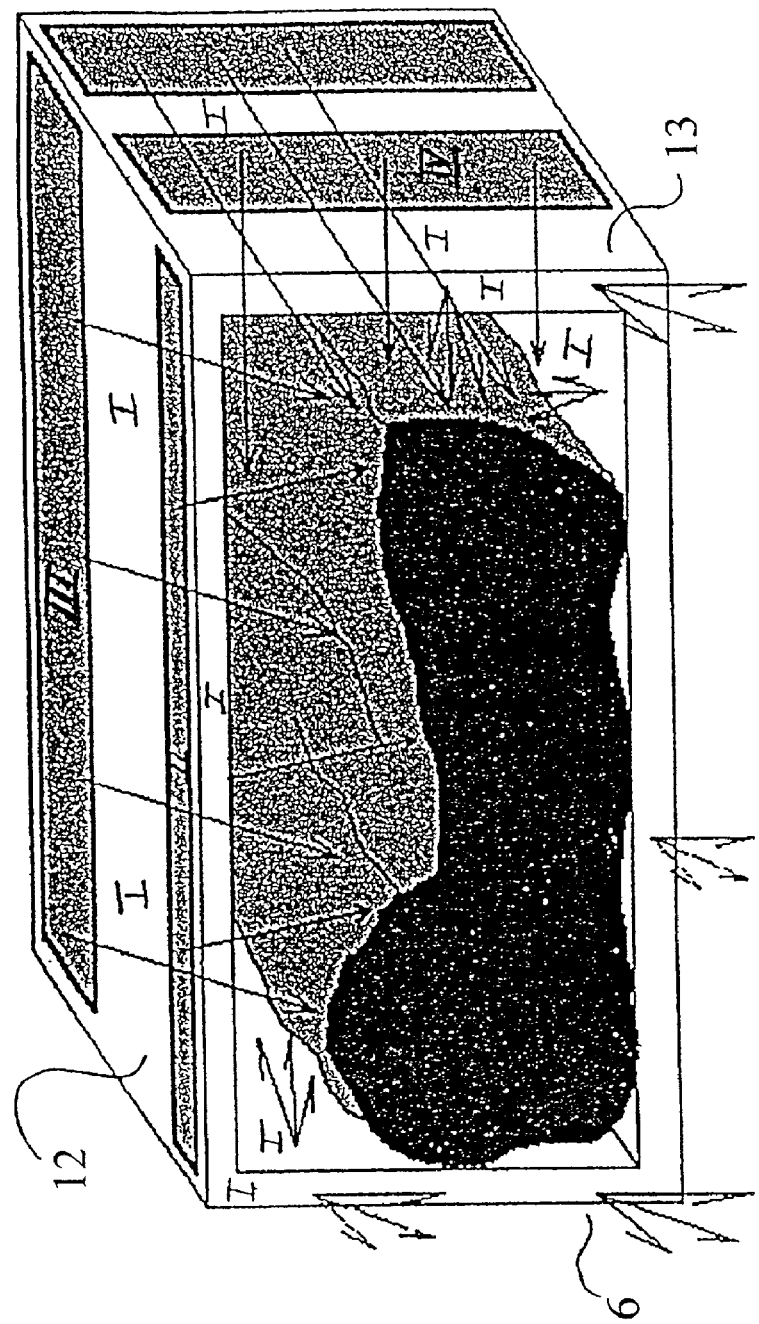
FIG. 3 is a perspective view of a lighting frame for the apparatus.

The cut surface is detected as a dark field in the photography method described, i.e. the environment of the cut surface 5 is brightly lit and the cut surface 5 appears dark. For this purpose, as FIG. 3 reveals, the lighting frame 6 is divided into several regions I, II, III, IV wherein the adjustable lighting elements 10 are installed. The lighting elements 10 are adjusted differently in the individual regions. The portions of the lighting frame 6 detected directly by the camera form the background for the product contour and must give off a diffuse and weak light. Therefore the lamps 10 are oriented in such a way that region I exhibits a diffuse radiation, i.e. the radiation intensity is reduced towards the cutting plane, with the edge also giving off radiation. Region I consists of the front edge of the lighting frame 6, a transverse strip in the middle of the cover 12 and the free side wall 13 of the lighting frame 6, the front side edge and the side wall with which the source body 2 is in contact.

In region II a directed field is provided towards the rear for illuminating any component parts such as e.g. the hold-down device 7, so that they do not cause any disturbing shadow on the illuminated surface of the source body 2. The component parts can also be provided with additional lighting elements attached therein. The surface of the source body 2 is also illuminated by region II to avoid shadow formation, e.g. due to undulations of the product surface. Region II is located in the front region of the cover 12 of the lighting frame 6.

In the rear region of the cover 12, counter to the direction of transport T, is provided a region III which delivers directed radiation forwards in the direction of the edge of the source body 2. The direction of radiation is oblique so that radiation through the source body 2 is as low as possible. Due to direct illumination of the edge, the contour of the source body 2 is emphasized.

Region IV is provided in the exposed at the center of the side wall 13 of the lighting frame 6. Region IV delivers radiation directed straight onto the source body 2. The other side wall with which the source body 2 is in contact may advantageously be slidable.

The lamps installed in regions I to IV may be manually or automatically adjustable, so that the lighting conditions can be adapted to the source bodies 2 and certain design conditions, such as for accommodating additional components and special hold-down devices 7 for the product. For this purpose a control system may be provided, not shown, comprising a memory in which settings of the lamps 10, which are stipulated for different ambient conditions, are filed. The control system is further designed in such a way that the individual lamps 10 can be adapted not only for the main setting, but also for different variations during the cutting operation. For this purpose the control system is connected by an interface to the detection device and to actuators of the lamps 10, wherein the detection device detects disturbing reflection and lack of contrast focus and delivers corresponding information to the control system for readjustment of the lamps 10.

The detection device 11 should be able to make a correction of the surface or its edge, depending on the pixel position of the detected image, thus equalizing the distortions by the angle of view and the distortions of the lens of the camera 9. Then correct determination of the cross-sectional area is possible. This rectification should preferably be carried out by corresponding hardware, so that with each cut, an image evaluation and adaptation of advance can take place immediately.

Figure 4:
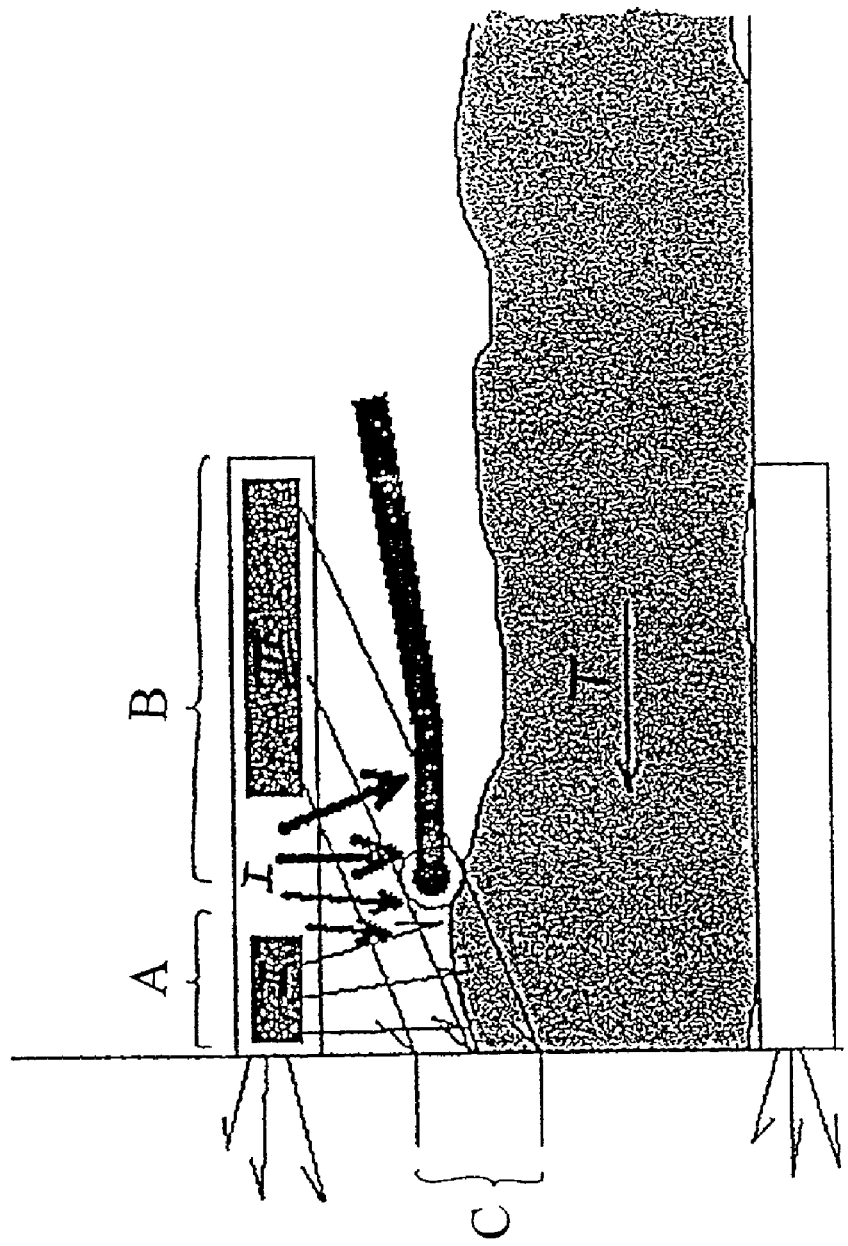
FIG. 4 is a longitudinal sectional view of the lighting frame.

FIG. 4 shows the lighting frame 6 in longitudinal section. From the path of the rays, which differs in the different regions I, II and III, it can be seen that the source body 2 is illuminated in planar fashion along its longitudinal direction, with different degrees of brightness and directions of radiation being provided. A first section A extends from the cut surface 5, in the longitudinal direction of the source body 2, counter to the direction of transport T. This section A has a low radiation intensity which is caused in particular by the fact that the light in region II is directed rearwards and the lamps 10 in section A give off diffuse radiation of low intensity. The section B located behind section A, seen counter to the direction of transport T, exhibits a high radiation intensity. For this purpose the lamps 10 in region I are controlled in such a way that they give off very bright light. A third section C in the region of the edge of the cut surface 5 is also irradiated with a high intensity by controlling the lamps 10 in region III accordingly.

It is particularly advantageous if the individual lamps 10 are controlled in pulsed fashion so that negligible generation of heat occurs. The camera 9 and the detection device 11 are, for this purpose, significantly operated in correspondingly triggered or shuttered fashion, so that a good camera focus and a high signal-to-noise ratio against ambient light are guaranteed. Furthermore a suitable additional lighting means can be arranged in front of the face 5, with the result that the dark field can be evaluated with differentiation, e.g.

to distinguish between fat and lean meat, or to detect holes existing in cheese and to factor the same in the weight calculation.

The radiation intensity of the lamps 10 can also be controlled by a light-transmitting element provided on the inner surface of the lighting frame, in which the light transmitting capacity is controllable. The element can be constructed after the fashion of an LCD display with a control matrix, with individual regions of the element being controllable differently. Or a plurality of elements which are each independently adjusted with a certain light transmitting capacity for the whole element may be provided.

Other objects, features and advantages will be apparent to those skilled in the art. While preferred embodiments of the present invention have been illustrated and described, this has been by way of illustration and the invention should not be limited except as required by the scope of the appended claims.

We claim:

1. An apparatus for separating discrete bodies from a source body having a face and a longitudinal direction, the apparatus comprising:
    a separating device;
    an advance device for advancing the source body towards the separating device;
    an optical detection device for determining the face area of the source body;
    a tunnel in which the source body is guided, the tunnel having an end adjacent the separating device;
    a plurality of lamps for illuminating the surrounding environment of the face; the lamps being mounted in the tunnel for illuminating in a planar fashion along the longitudinal direction of the source body such that the face and the surrounding of the face have an optical contrast,
    wherein the optical detection device determines the area of the face by means of said optical contrast between the surrounding environment and the face, and the source body is advanced as a function of the detected face area as determined by the optical detection device;
    wherein the tunnel comprises a front edge in which the lamps deliver diffuse radiation with an intensity which is reduced towards the face; and
    wherein the tunnel comprises a cover adjacent to the front edge in which the lamps deliver radiation directed rearwards away from the face.

2. An apparatus according to claim 1, wherein the lamps are controlled in pulsed fashion and the optical detection device is controlled in correspondingly triggered fashion.

3. An apparatus according to claim 1, wherein the lamps are potted and form a smooth surface.

4. An apparatus according to claim 1, wherein the lamps are individually adjustable.

5. An apparatus according to claim 4, wherein the lamps are movable by motorised means and a control system is provided for adjustment of the lamps.

6. An apparatus according to claim 5, wherein the control system has a memory for the storage of settings for the lamps for respective ambient conditions.

7. An apparatus according to claim 6, wherein the control system evaluates reflection and contrast of the detected image and the control system adjusts the lamps to minimise reflection and increase contrast.

8. An apparatus according to claim 4 wherein the direction of radiation of the lamps can be oriented individually.

9. An apparatus according to claim 1, wherein the tunnel is made of a reflective material.

10. An apparatus for separating discrete bodies from a source body having a face and a longitudinal direction, the apparatus comprising:
    a separating device;
    an advance device for advancing the source body towards the separating device;
    an optical detection device for determining the face area of the source body;
    a tunnel in which the source body is guided, the tunnel having an end adjacent the separating device;
    a plurality of lamps for illuminating the surrounding environment of the face, the lamps being mounted in the tunnel for illuminating in a planar fashion along the longitudinal direction of the source body such that the face and the surrounding of the face have an optical contrast,
    wherein the optical detection device determines the area of the face by means of said optical contrast between the surrounding environment and the face, and the source body is advanced as a function of the detected face area as determined by the optical detection device;
    wherein the tunnel comprises a front edge in which the lamps deliver diffuse radiation with an intensity which is reduced towards the face; and
    wherein the side wall of a lighting frame provided for contacting the source body is slidable.

* * * * *